United States Patent [19]

Tockert

[11] Patent Number: 4,986,494
[45] Date of Patent: Jan. 22, 1991

[54] PROCESS OF STABILIZING AT ALTITUDE A STRATOSHPERIC BALLOON, AND BALLOON ADAPTED FOR CARRYING OUT THE PROCESS

[75] Inventor: Christian Tockert, Toulouse, France

[73] Assignee: Centre National D'Etudes Spatiales (C.N.E.S.), Paris, France

[21] Appl. No.: 443,670

[22] Filed: Nov. 29, 1989

[30] Foreign Application Priority Data

Nov. 30, 1988 [FR] France .................. 88 15798

[51] Int. Cl.$^5$ ............................................. G64B 01/58
[52] U.S. Cl. .................................... 244/96; 244/097
[58] Field of Search ................... 244/31, 33, 96, 9 A

[56] References Cited

U.S. PATENT DOCUMENTS

| 3,484,058 | 12/1969 | Struble, Jr. | 244/31 |
| 3,565,368 | 2/1971 | Byron | 244/31 |
| 4,094,299 | 6/1978 | Voelker | 244/33 |
| 4,262,864 | 4/1981 | Eshoo | 244/31 |
| 4,865,266 | 9/1989 | George | 244/97 |

Primary Examiner—Joseph F. Peters, Jr.
Assistant Examiner—Virna Lissi Mojica
Attorney, Agent, or Firm—Harold H. Dutton, Jr.

[57] ABSTRACT

The invention relates to a process for stabilizing at altitude a stratospheric balloon between the upper and lower levels through a plurality of diurnal and nocturnal cycles. The process comprises providing the stratospheric balloon (1) of the open, variable volume type a with a thermal trapping hood (7) arranged in the vicinity of its upper pole piece (4). This hood has reflecting properties from the side oriented toward the interior of the balloon and preferably thermal insulating properties, and its surface comprises between 1% and 15% of the total surface area of the balloon when full, preferably between 2% and 5%. In the full state, it does not appreciably alter the thermal balance of the balloon, while at lower levels at reduced states of inflation, it limits the energy loss from the bulb by reflecting toward the exterior and avoids an irreversible descent of the balloon. The process of the invention permits stabilizing a stratospheric balloon during a number of cycles which may be several tens of cycles.

13 Claims, 11 Drawing Sheets

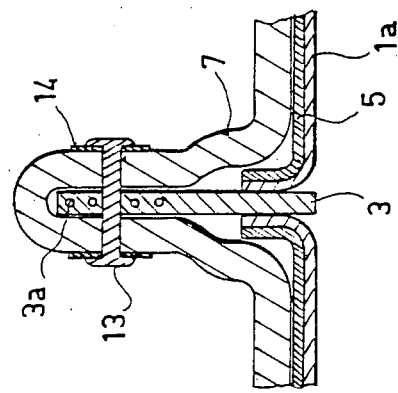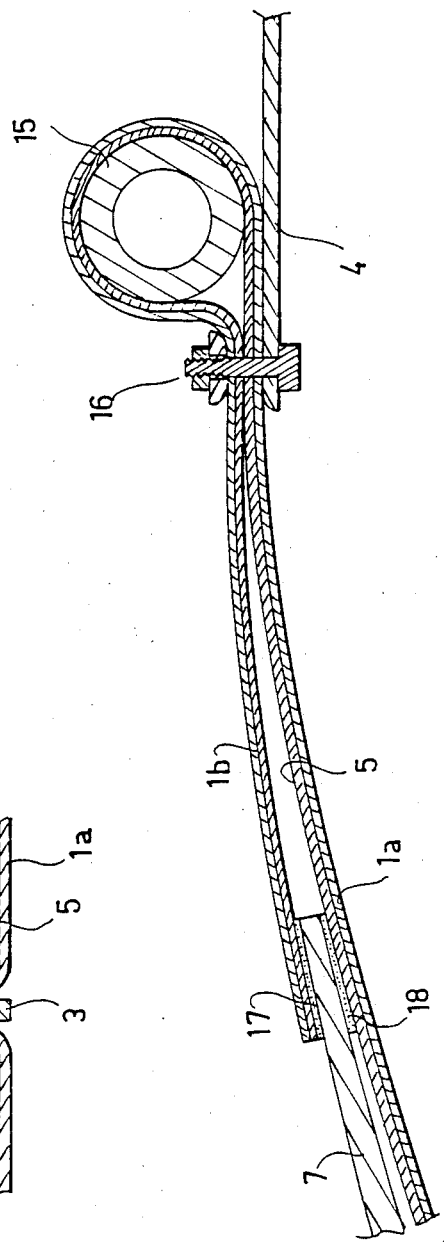

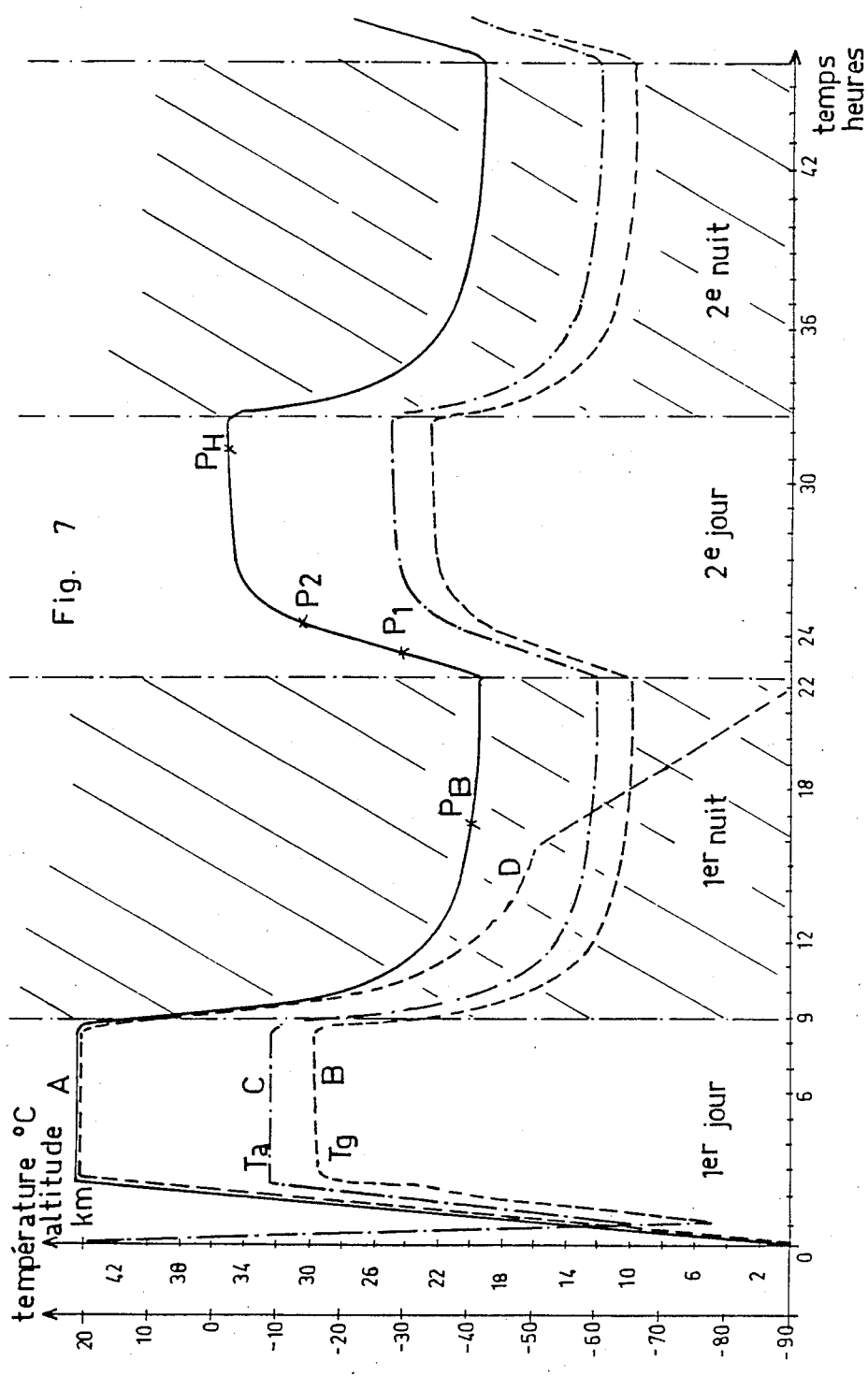

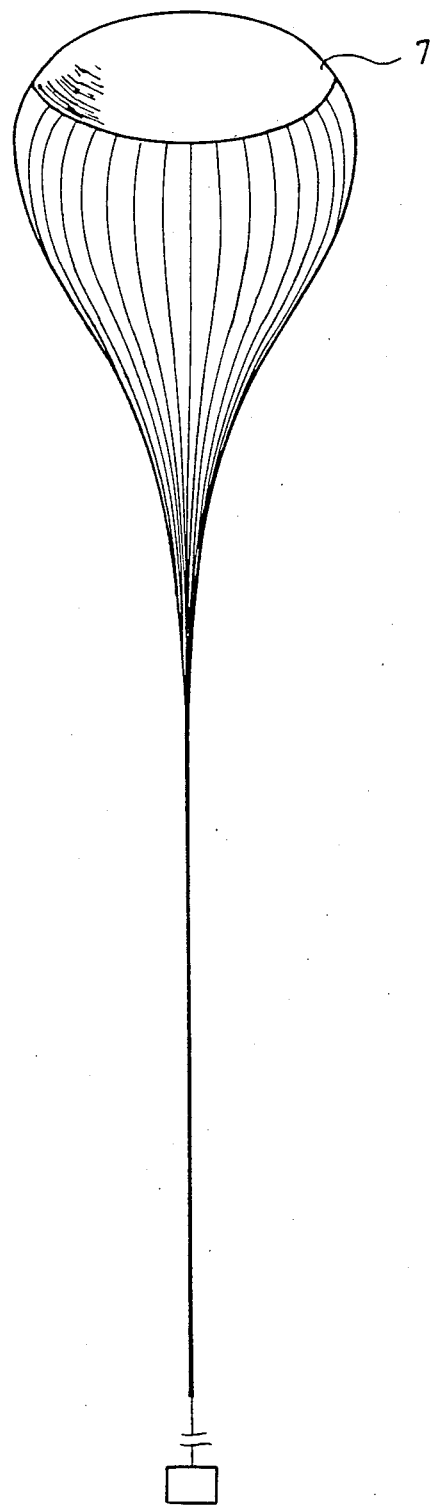
Fig.8P$_B$

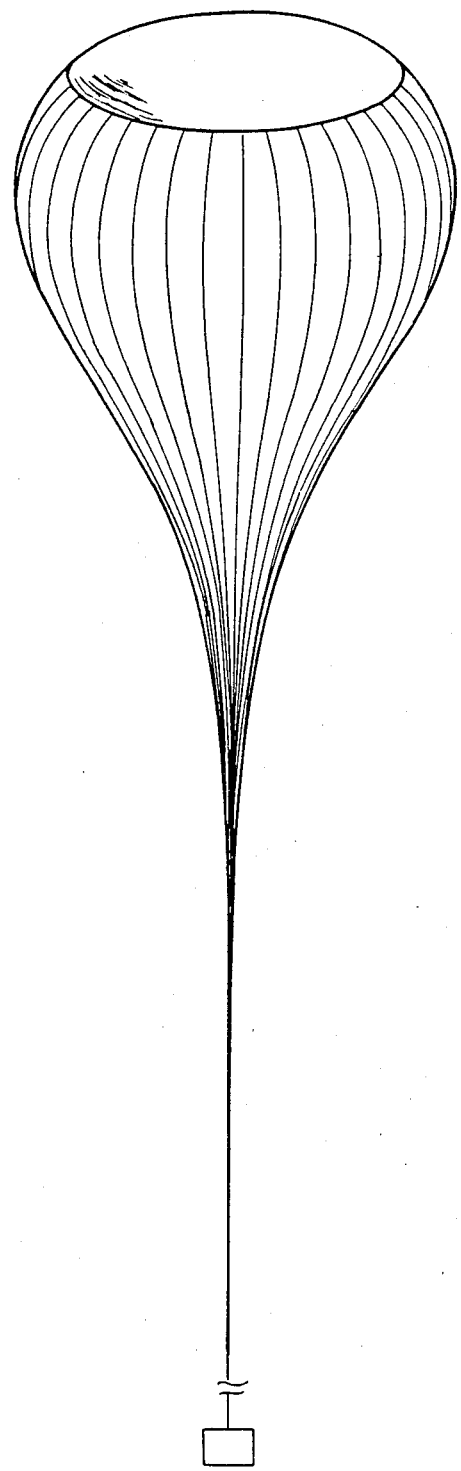
Fig. 8 P₁

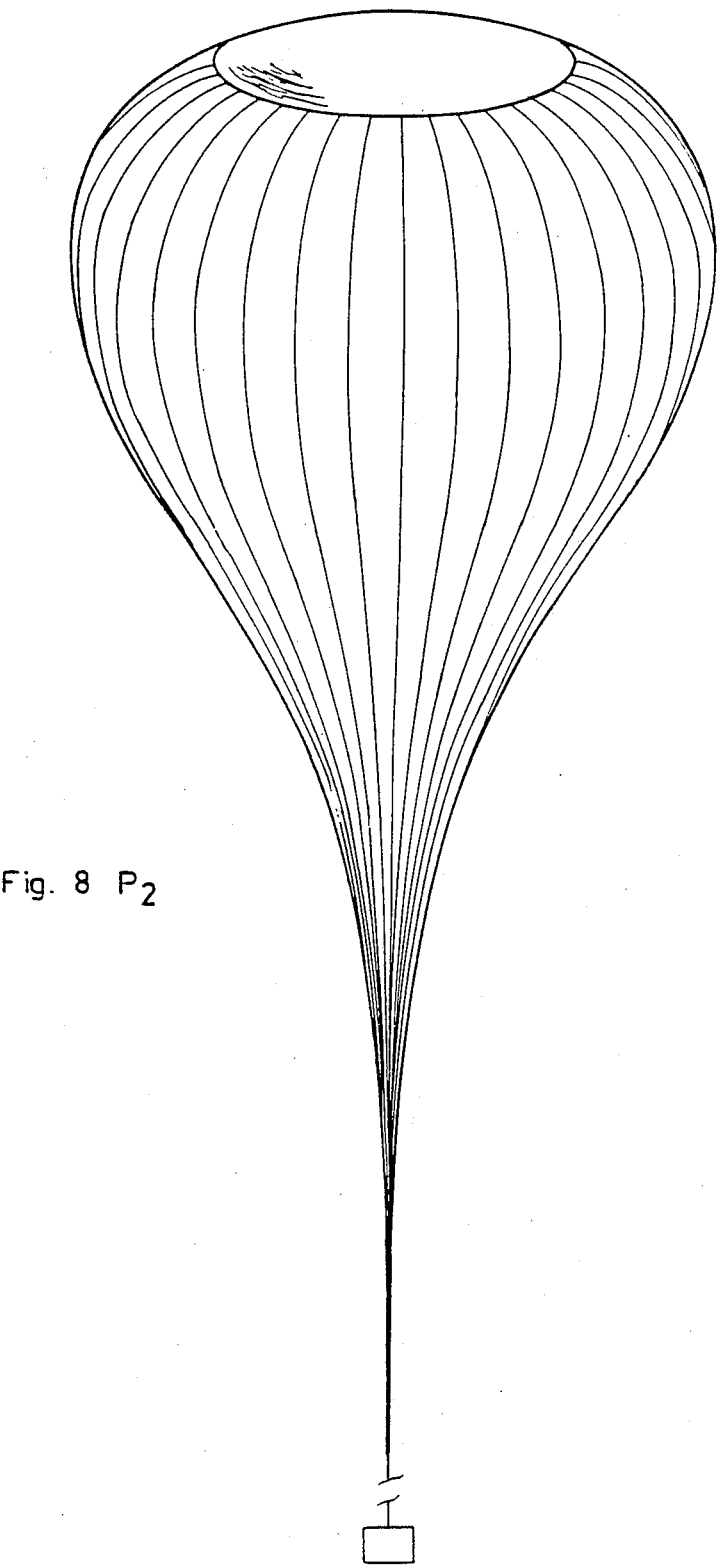
Fig. 8 P₂

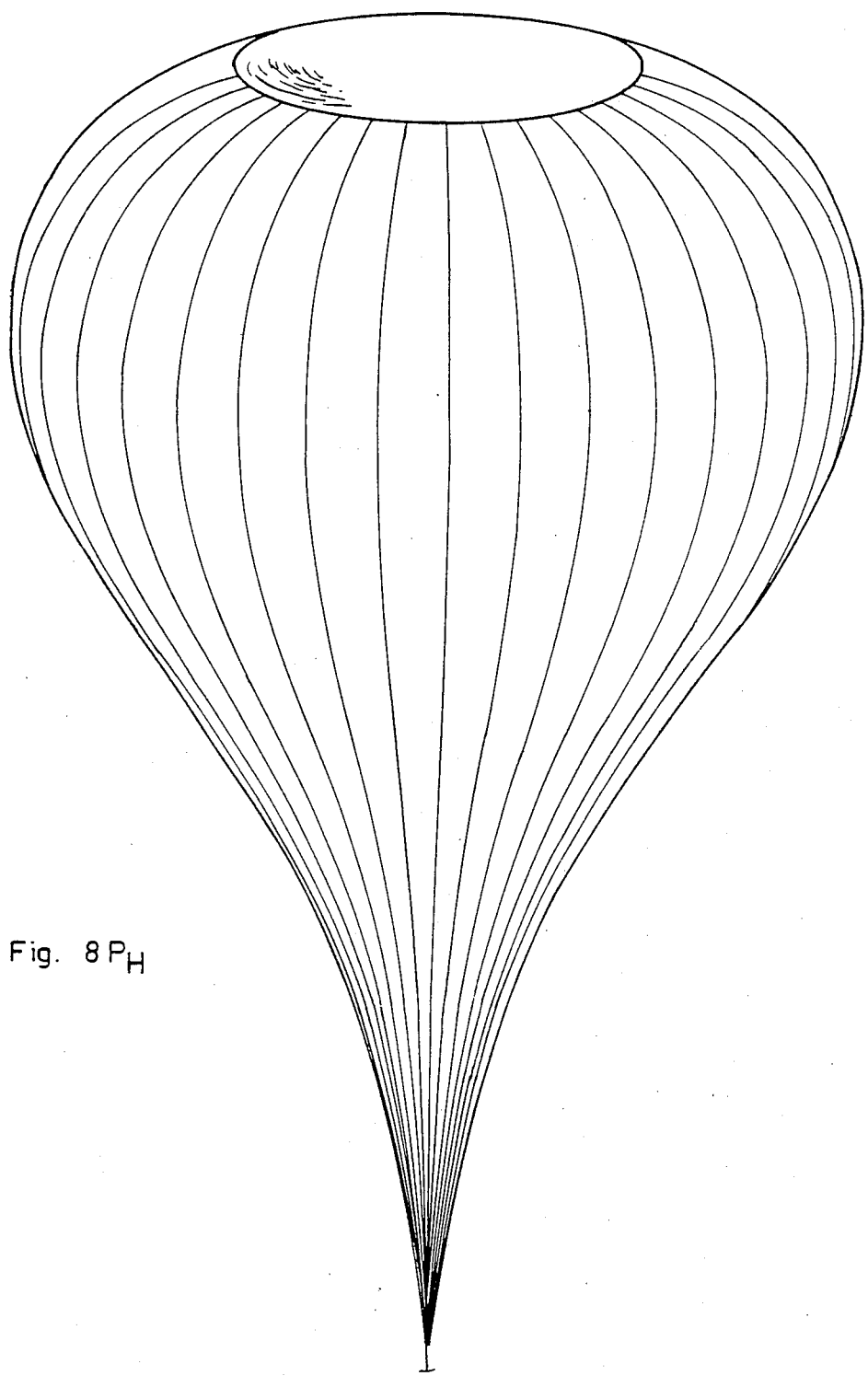
Fig. 8 $P_H$

PROCESS OF STABILIZING AT ALTITUDE A STRATOSHPERIC BALLOON, AND BALLOON ADAPTED FOR CARRYING OUT THE PROCESS

This invention relates to a process for stabilizing at altitude a variable volume, stratospheric balloon between upper and lower levels during a plurality of daytime and nightime cycles. It provides for stabilization of open type, variable volume stratospheric balloons, having an envelope of a transparent material, having a state of fullness in which said envelope is completely inflated, and states of reduced inflation where said envelope has the shape of an upper bulb extended by a lower train. By the term "transparent material" is meant, by custom, a material which allows passage of solar and infrared radiation with a very minimal absorption with respect to the incident radiation. This material may in particular comprise polyethylene or polyester, which are the materials generally used to produce stratospheric balloons.

BACKGROUND AND OBJECTS OF THE INVENTION

It is known that stratospheric balloons with a variable volume may present very significant volumes (greater than $10^6$ m$^3$) and carry heavy loads up to altitudes on the order of 40 to 45 km. These stratospheric balloons are characterized especially in that they operate with a lighter than air gas from which they draw their ascending force, and in that the volume at a state of fullness is much greater (of a factor much greater than 10) than their volume at their bulbous state (a state of reduced inflation). This type of balloon is, for example, described in U.S. Pat. No. 3,312,427. These stratospheric balloons differ completely from hot air balloons which are balloons having a constant volume, using the gas of the atmosphere in which they are immersed and drawing their ascending force, either from a burner or from ambiant radiation (solar or infrared). Solar or infrared hot air balloons are produced in such a manner as to captivate permanently the maximum solar or infrared energy and, for this reason, are provided on at least half of their surface with a device for trapping solar or infrared radiation. The hot air balloons may for example be illustrated by French patent No. 2,418,150 or U.S. Pat. No. 4,262,864.

The basic problem which is presented by variable volume stratospheric balloons, which are the subject of this invention, resides in their very short length of life, on the order of 24 hours, and which may only be extended by several days by releasing significant quantities of ballast. In effect, during the daytime period, when a stratospheric balloon reaches a state of fullness, a portion of the gas is expelled until the rising force is annulled, the balloon being stabilized at its flight ceiling. At night, the gasses of the balloon are subjected to a significant cooling which causes a considerably diminution of the volume thereof and an irreversible descent. Only a releasing of ballast then permits a stabilization (on the order of 10% of the weight of the assembly). However, the rising force which is then restored, appears the following day and results in a new expulsion of the gas at the ceiling, such that the operation of the release of the ballast must be done again each night in order to avoid an irreversible descent. The quantities of ballast released being limited, the duration of life of such balloons cannot generally exceed 4 or 5 days. This limitation of the period of life is a serious drawback of this type of balloon, while the obligation for releasing ballast of sizeable quantity is very penalizing since it requires, for a given useful load, increasing the volume of the balloon and the mass of aerostatic gas, and as a consequence, leads to an increase in the cost of a flight.

The present invention proposes to overcome the drawbacks mentioned above for stratospheric balloons of the variable volume, open type.

The essential object of the invention is to avoid, by means other than a release of ballast, an irreversible descent of the balloon during the nocturnal period, in such a manner as to assure a stabilization of the balloon between the upper levels (daytime periods) and the lower levels (nocturnal periods) during a plurality of daytime and nighttime cycles.

DESCRIPTION OF THE INVENTION

To this end, the process for stabilizing according to the invention comprises providing the upper part of the stratospheric balloon with a thermal trapping hood having reflecting properties oriented toward the interior of the balloon. This thermal trapping hood is sized such that its surface will be:

greater than about 1% of the total surface area of the balloon when full so as to cover a significant portion of the bulb in a state of reduced inflation and to limit in this state the energy lost by re-emission to the exterior, and less than about 15% of the total surface area of the balloon when full in such a manner as to, firstly, slightly modify the thermal balance of the balloon in this state, and secondly leaving uncovered the lower part of the bulb in a reduced state of inflation.

The balloon thus equipped is launched in a conventional manner by introducing into its envelope an appropriate quantity of a lighter than air gas (generally hydrogen or helium) and assuring its taking off by any known process (process by stretched dragging, process using one or several auxiliary balloons . . .).

The ascension of such a balloon is carried out in a conventional manner under the effect of the free isothermal ascending force which is communicated to it at the start. When the balloon reaches its state of full inflation, the thermal trapping hood has no appreciable influence on the thermal balance because of the reduced surface with respect to the total surface of the balloon in this state. The ceiling altitude is then essentially identical to that of an identical balloon without the hood. At night, the balloon begins a descent under the influence of cooling of its aerostatic gas and its reduced volume. The thermal trapping hood then occupies a greater and greater relative surface. By way of example, it is known that the variation of the volume of an open stratospheric balloon between the level of 16 km and the level of 40 km is in the ratio of 66, while the variation of the surface contacted by the aerostatic gas (ratio of the surface of the balloon when full to the surface of the bulb at the lower level) is then a ratio of 17. Thus, at the lower level, the thermal trapping hood has a surface sufficient to cover a significant fraction of the bulb and to modify the thermal balance of the balloon. It produces a radiant uncoupling of the balloon vis-a-vis the very cold bottom of the sky, while it improves the coupling with the lower half-plane (from which comes the infrared radiation rising from the ground or the clouds), such that the equilibrium temperature of the aerostatic gas ($T_G$) is particularly greater than that of the same balloon without the hood. Further, the equations governing the equilibrium of the balloon show that, in the absence of release of ballast, the stabilization is produced when the ratio $T_G/T_a$ (temperature of the aerostatic gas to the temperature of the external air) becomes during a period of nighttime equal to its value during the daytime:

$$\left(\frac{T_G}{T_a}\right)_{night} = \left(\frac{T_G}{T_a}\right)_{day}$$

In the case of a balloon without a hood, at night this ratio of temperature remains much less that the ratio during the day by reason of the low value of the temperature of the aerostatic gas $T_G$. By contrast, in the case of the invention, the thermal trapping hood increases the temperature $T_G$ (night) without modifying appreciably the temperature $T_G$ (day) and, as simulations have shown, there then exists a level of stabilization in the stratosphere, without a release of ballast, in particular at the end of a certain number of cycles, in order to achieve very long periods of stabilization while compensating the slow diffusion of gas through the envelope.

According to one preferred characteristic of the invention, the thermal trapping hood, in addition to its reflecting properties, has thermal insulating properties in order to limit the loss at night by conduction which tends to increase again the temperature $T_G$ at night. Further, it may be reflecting on its exterior side in order to reflect the radiation during the daytime period.

The surface of the hood preferably comprises between 2% and 5% of the total surface area the balloon in a state of fullness. These values improve the increase of the temperature $T_G$ at night, because the surface of the hood extends then over about half of the surface of the bulb. The separation with the bottom of the sky is thus optimized, in the same manner as the trapping of infrared radiation rising from the lower half-plan. In particular, for stratospheric balloons having at a full state volume on the order of $10^5$ to $2 \times 10^6$ m$^3$ (typical volume of this type of balloon), a hood with a surface of about 3% of the surface in the full state will be provided. (By neighboring surface is meant a surface not deviating by more than ±15% of the value indicated.) The inflating gas may be hydrogen or helium; it will preferably be hydrogen because of its lower cost, its lower molar mass, and its lower diffusion ability. Further, according to another characteristic of the process of the invention, the useful load provided which is carried at the time of launching is preferably such that the total floating mass M of the balloon satisfies the following relationship:

$$1.9 \times 10^{-3} V \leq M \leq 3.9 \times 10^{-3} V$$

where M is expressed in kg and V is the volume of the balloon when full, expressed in m$^3$. This mass, notably lower than for conventional stratospheric balloons, permits achieving a peak altitude of between 40 km and 45 km (closer in practice to 45 km). Under these conditions, regardless of the radiation situations to which the balloon is exposed during the day, the temperature of its gas $T_G$ remains lower than the external air temperature $T_a$ by reason of the very low conductions and convections at these altitudes and the positive temperature gradient up to 45 km altitude (stratopause). The expulsions of gas at the peak altitude (of the day) are thus limited, which raises the level of stabilization of the night and permits a greater number of cycles of stabilization.

The invention also relates to a new product, a stratospheric balloon adapted to carry out the process hereinabove defined. This balloon, of the open type with variable volume comprises in a conventional manner a flexible envelope of a transparent synthetic material, in particular of polyethylene or polyester, provided in its lower part with a gas evacuation sleeve and means for attaching a load. According to the invention, a hood, called a thermal trap is secured on the upper part of the envelope, the hood having properties of reflecting toward the interior of the envelope and presenting a surface comprising essentially between 1% and 15% of the total surface area of the envelope, and preferably between 2% and 5%.

The thermal trapping hood is preferably comprised of a thermal insulating complex having at least one reflecting face, particularly metallic, facing toward the interior of the envelope.

DESCRIPTION OF THE DRAWINGS

Other characteristics, objects and advantages of the invention will become apparent from the description which follows with reference to the accompanying drawings which show one embodiment of a balloon according to the invention and illustrate the process of stabilization carried out. In these drawings:

FIGS. 2, 3 and 4 are detailed sectional view of the hood which equips the envelope showing the hood on the upper part and the securing of the hood to the gores, while

FIG. 7 is a diagrammatic view showing, as a function of time, the variations of altitude of the balloon according to the invention (curve A in solid lines), the variations of the temperature of the aerostatic gas (curve B in broken lines), the variations of the temperature of the external air (curve C in mixed lines), and finally by comparison, the variations of altitude of a conventional balloon of the same characteristics, subjected to the same meteorological conditions, but without the thermal trapping hood (curve D);

Figure 9:
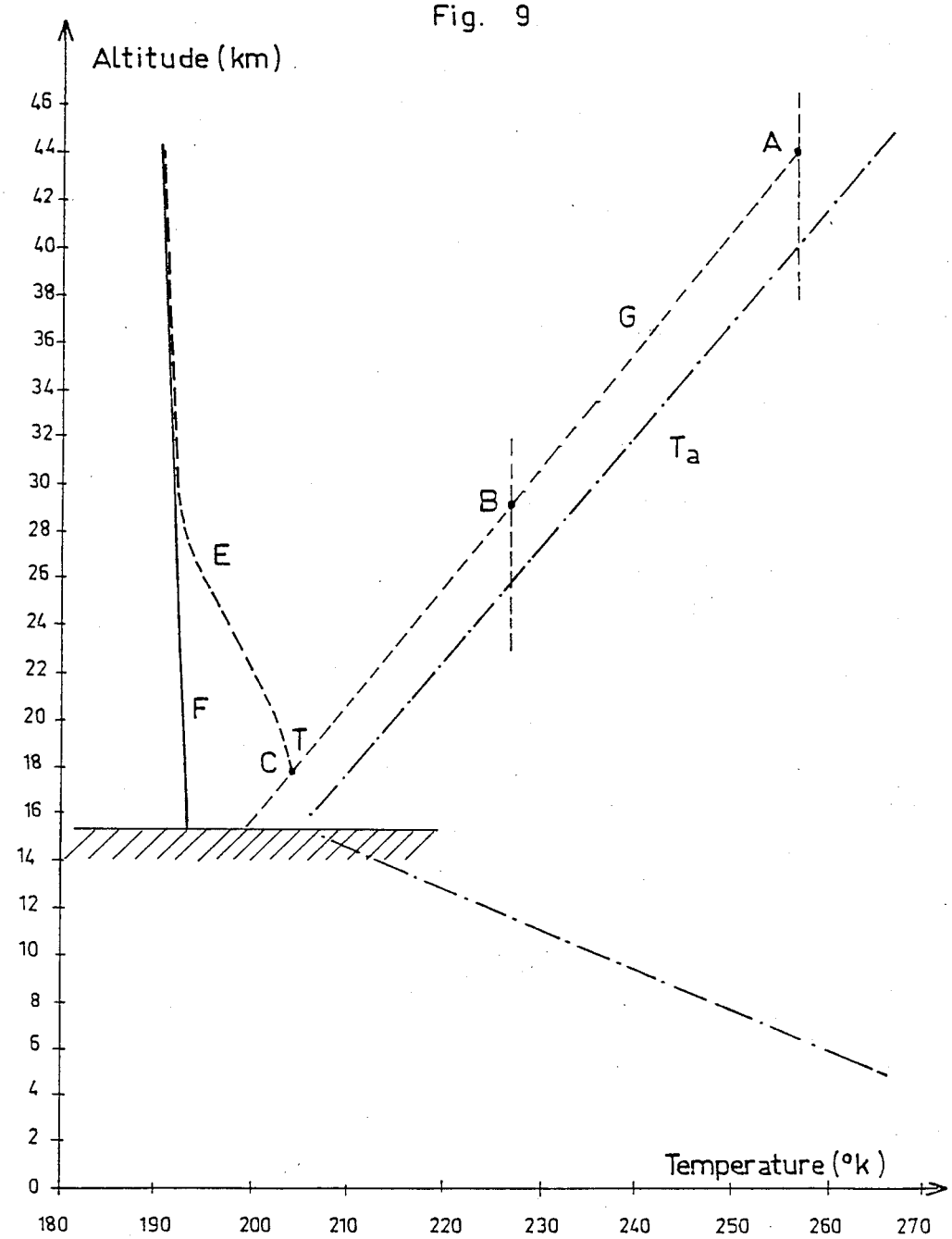

FIGS. $8P_B$, $8P_1$, $8P_2$, $8P_3$ and $8P_H$ are schematic views giving the shape of the balloon respectively at a low point of nocturnal stabilization, at intermediate altitudes and at a high point of daytime stabilization;

FIG. 9 is an explanatory diagram intended to permit a better understanding of the stabilization phenomenon of the balloon according to the invention.

DETAILED DESCRIPTION OF PREFERRED EMBODIMENTS

The stratospheric balloon shown by way of example in the drawings has an envelope 1 formed in a conventional manner by a plurality of longitudinal gores which are assembled together along their borders (in the example by the technique termed "peeling"). Bands or strips such as 3 are secured at the edges of the gores, for taking up the longitudinal stresses.

Figure 1:
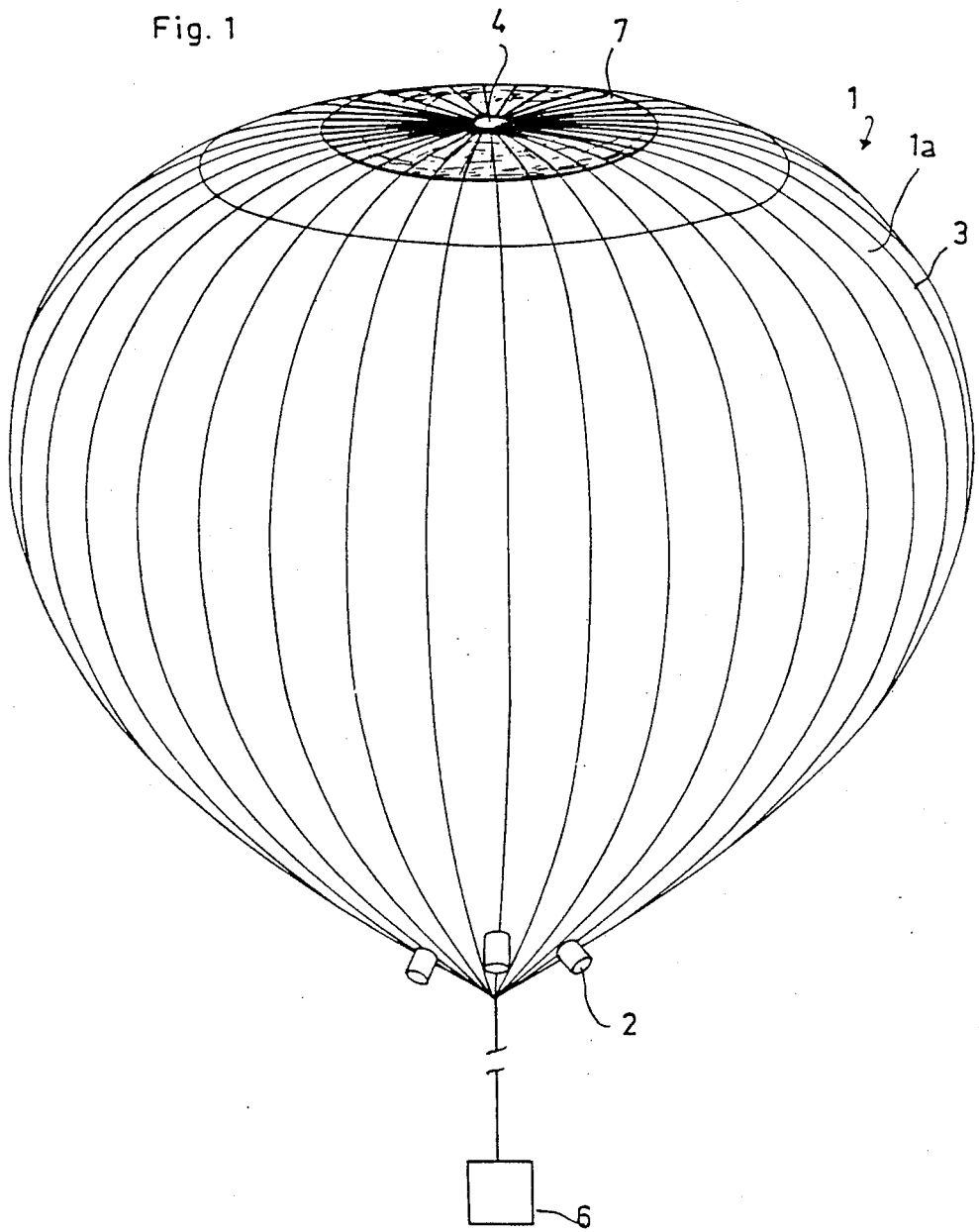
FIG. 1 is a schematic view of a balloon according to the invention in its state of full inflation.

This balloon which is shown in its state of full inflation in FIG. 1 is provided at its base with four evacuation sleeves such as 2. In the upper part, the force restraining bands 3 and the gores are mechanically assembled to a metallic pole piece 4, with the interposition of a transparent closing dome 5, called a structural dome, which is secured to the upper part of the balloon at the edges of the gores. A lower hook (not visible) is attached to the restraining bands 3 at the lower part for attaching a useable load 6. These structures are conventional for stratospheric balloons, the gores being for example of polyethylene of 15 micron thickness, the reinforcing bands of polyethylene reinforced with bundles of polyester fibers and the structural dome 5 of polyethylene of 15 micron thickness.

According to the present invention, a thermal trap hood 7 is secured to the upper part of the balloon in the form of a dome surrounding the upper pole. This hood 7 has, in the example, a surface area equal to 2.8% of the total surface of the balloon in its state of full inflation. For a balloon of 400,000 m$^3$ which is the case provided by the present example, the thermal trapping hood 7 has a surface of 750 m$^2$ for a total balloon surface of 27,000 m$^2$ when full.

The hood 7 is formed by a complex which is both insulating in a thermal sense, reflective toward the interior of the balloon and reflective toward the exterior of the balloon.

Figure 2:
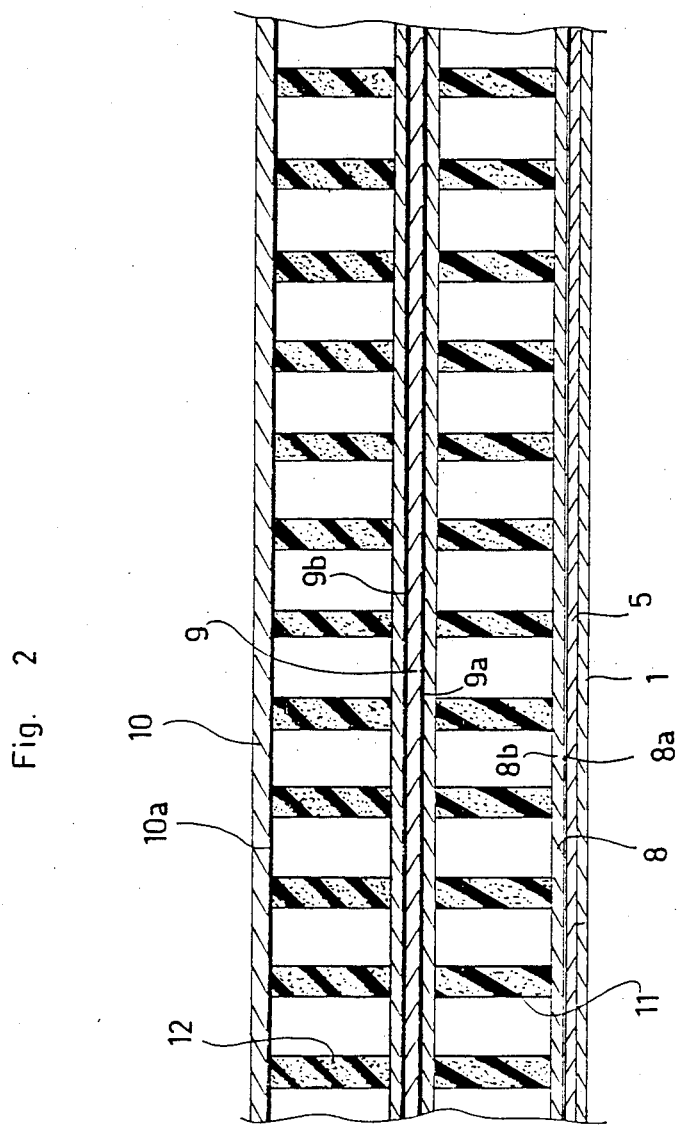

FIG. 2 shows an example of the structure of this complex. The hood 7 is superimposed on a part of the structural dome 5 and is formed by three sheets of metallized polyester 8, 9 and 10 between which are interposed two layers of foam 11 and 12.

The sheet 8 situated against the structural dome 5 is aluminized on its two faces 8a and 8b; its thickness may be on the order of 6 microns.

The layer of foam 11 adhered to the external face 8b of this sheet is an open cell polyester foam, perforated with a multiplicity of openings such as 11a. This layer of very low density foam may have a thickness on the order of 5 mm and serves the function of interconnecting the internal sheet 8 and the intermediate sheet 9.

The intermediate sheet 9, having a thickness on the order of 6 microns, is interposed between the two layers of foam 11 (without bonding in order to preserve the flexibility of the complex) and is aluminized on its two faces 9a, 9b. This sheet improves the radiative separation between the sky and the interior of the balloon due to the reflecting ability of these faces, and forms a convective barrier between the two layers of foam 11 and 12.

The layer of foam 12 is identical to the layer 11; it is positioned without bonding against the intermediate sheet 9.

Finally, the external sheet 10 of a thickness on the order of 12 microns has an aluminized internal face 10a which is bonded to the layer 12 in order to reflect the radiation during the diurnal period. The external face of this sheet is not aluminized in order to minimize the diurnal heating of the complex.

The hood 7, the structure of which is described above, is fixed at the edge of the gores 1a and in the vicinity of the pole piece 4 by its upper edge.

FIG. 3 shows in cross section the securing to the gores. The edges of two adjacent gores, such as 1a are bonded to a force take up strip 3 which runs a predetermined length on the order of 3 cm. This length of overlap comprises the aforementioned reinforcing bundles 3a. Between two gores, the thermal trapping hood 7 overlaps the strip 3 and is connected thereto by synthetic rivets 13; reinforcing eyelets 14 are fastened to the external face of the hood at the heads of each rivet.

Figure 5:
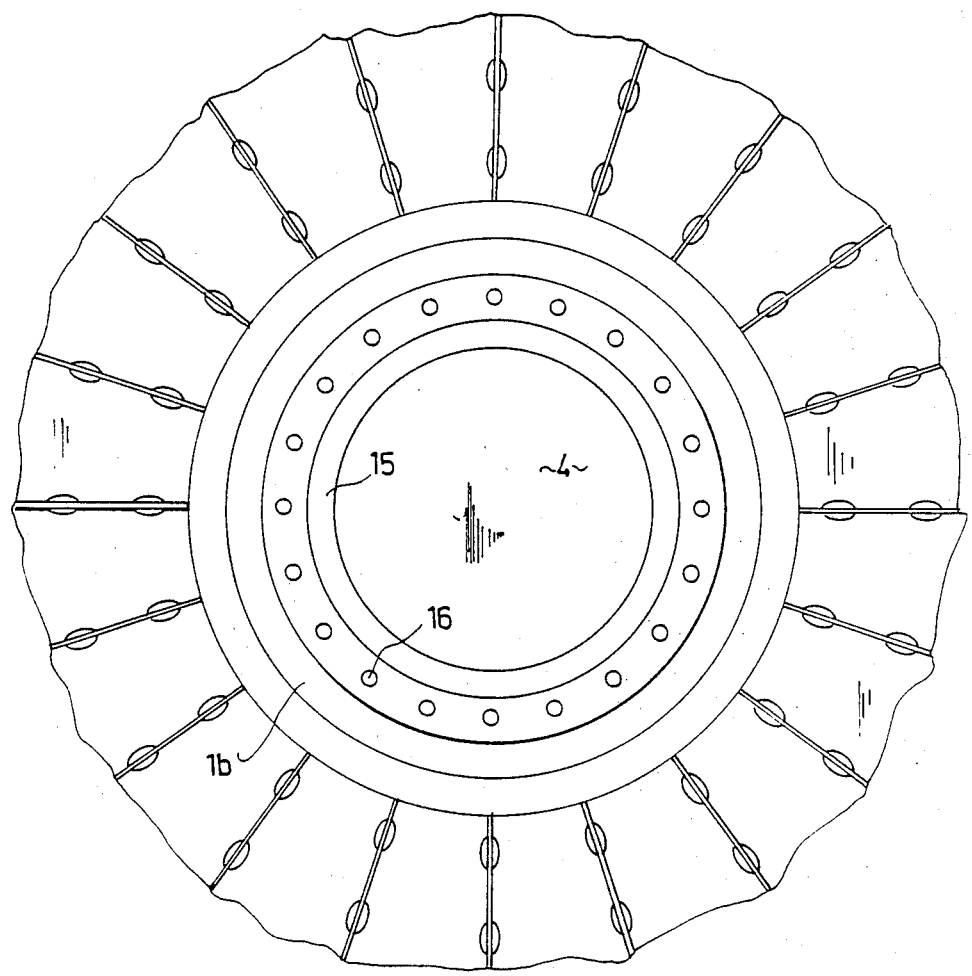
FIG. 5 is a top plan view of the upper pole piece of the balloon.

FIGS. 4 and 5 show respectively in partial cross-section and in top view the securing of the gores onto the pole piece 4. This pole piece comprises a disk of an aluminum alloy and the gores are conventionally secured to this disk at a fold formed around a torous 15 of an aluminum alloy. A series of bolts 16 permits securing on the pole piece 4 the gore 1a and the external flange 1b which forms the fold (a protection is provided in a conventional manner on the screws of the bolts). The thermal trapping hood is secured in the upper part between the gore 1a and its external flange 1b (the structural dome 5 which is fixed with the gore is assimilated to the latter). This bonding may be achieved by means of double face adhesive strips 17 and 18.

Figure 6:
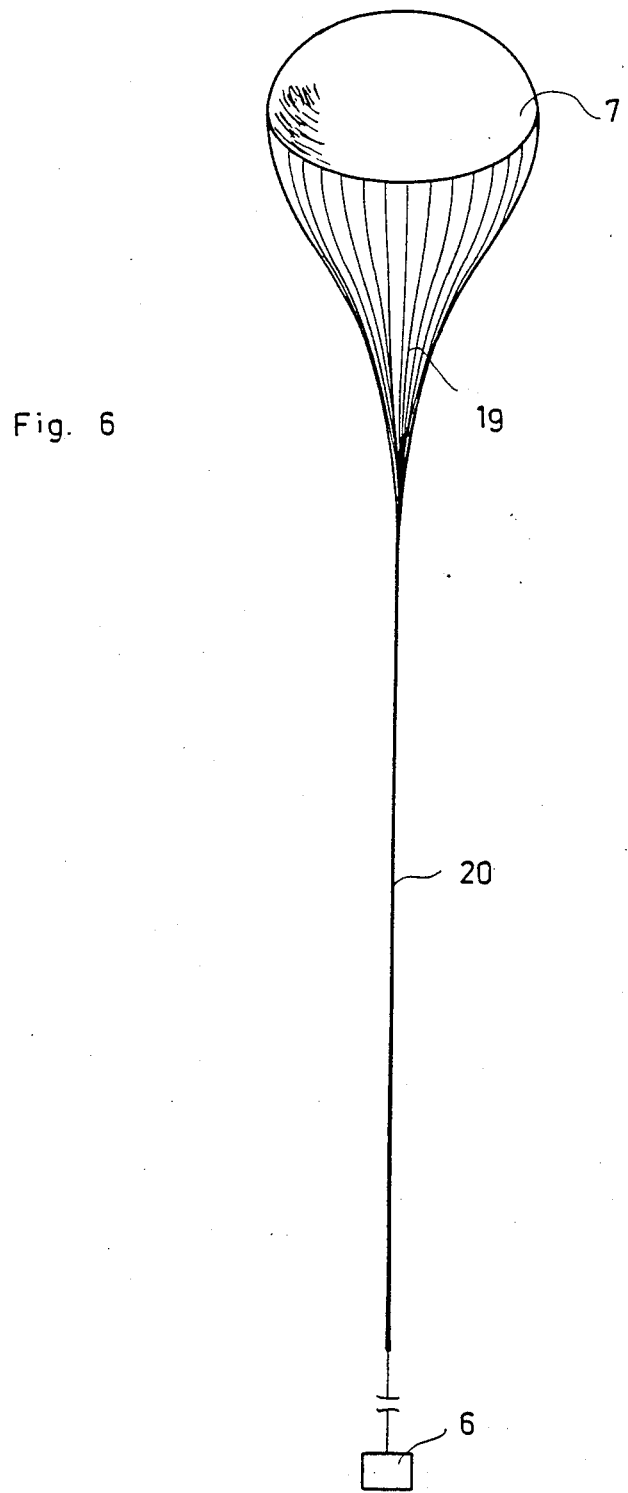
FIG. 6 is a schematic view of the balloon in a reduced state of fullness corresponding to a night-time stabilization.

FIG. 6 shows the balloon according to the invention in a state of reduced inflation. It is then in the form of a bulb 19 the volume of which is about 5,300 m$^3$ at 16 km altitude (for the aforementioned balloon of 400,000 m$^3$ when full), the surface of said bulb being 1,500 m$^3$. During stabilization, this state is in practice the lowest state of inflation (the lowest stabilization altitude). The thermal trapping hood then occupies half of the surface of the balloon. The bulb 19 extends along a train 20 formed by the gores which are folded upon each other below the bulb.

FIG. 7 shows the curves obtained by a thermal and dynamic simulation with a balloon such as described above, having the following parameters: total volume: 400,000 m$^3$; mass of balloon plus hood: 650 kg; useful load: 300 kg; mass of hydrogen: 77 kg. These curves have been obtained using the atmospheric tables at 38° North (long night), which represents an unfavorable situation.

Curve A gives the altitude as a function of the time. The rise after launching is carried out in a manner close to that of a conventional stratospheric balloon without a hood. However, the total buoyant mass being much less (1,027 kg instead of about 1,700 kg), the balloon reaches an altitude of about 44 km. The radiation situation of the simulation provided for the first day: a reflection coefficient of 0.7; a total infrared flux of 240 W/m$^2$ (corresponding to the presence of low clouds), a solar constant of 1,360 W/m$^2$. It should be noted that this situation is unfavorable because it produces the greatest internal heating of the balloon. The curve B gives the internal temperature of the balloon $T_G$ and curve C the external temperature of the air $T_a$. The ratio $T_G/T_a$ is equal to 0.97 when full. At 44 km, The simulation then provided a very cold nocturnal period (total infrared flux: 110 W/m$^2$), which is a very unfavorable situation. The balloon descends and is stabilized at 19.5 km (point $P_B$).

FIG. 8$P_B$ shows the shape of the balloon at this altitude. The thermal trapping hood 7 occupies a surface area on the order of 36.4% of the bulb. In this state, the hood 7 traps the total flux of the lower emission plan (cloud in the condition) and limits the cooling of the bulb to the point of obtaining a ratio $T_G$ at night identical to the ratio during the day, which is indicative of the stabilization that the equations show.

The simulation then provided for a day with a radiation coefficient equal to 0.7 and an total infrared flux of 110 W/m$^2$ (very high, cold cloud), which represents a realistic situation. The balloon is reheated and the balloon rises. The drawings of FIGS. 8$P_1$ and 8$P_2$ show its shape at two intermediate levels (24 km and 30 km). The relative surface of the hood 7 decreases and its thermal influence diminishes.

The peak diurnal level is directly a function of the radiation conditions of the day considered. In the example give, the flux of 110 W/m² (instead of 240 the first day) causes a peak about 35 km. The balloon doesn't reach a full state (no loss of gas) and its shape is shown in FIG. 8P$_H$. This altitude of culmination has no effect on the other stabilization cycles which follow, the number of cycles of stability only being limited by the diffusion through the envelope; this would be the case, if needed, for a release of ballast after several weeks.

By way of comparison, curve D shows in dotted lines the variations of altitude of an identical balloon to that described above (same load, same volume . . .) but without the thermal trapping hood. The simulations showed that this conventional balloon descended in an irreversible manner the first night, with rapid increase in speed of descent upon passage through the tropopause.

FIG. 9 is a theoretical diagram of the altitude/temperature stability of the balloon according to the invention (curve E), (the temperatures being equilibrium temperatures of a balloon assumed to be stationary at each instant). There are also shown on this drawing:
- a curve F analogous to curve E but for a conventional balloon without the hood,
- a curve $T_a$ giving the profile of the temperatures of external air,
- a curve G which is the theoretical law of stability (defined by the ratio $T_g/T_a$ of the day).

The cross-hatched portion represents a cloud at the limit of the tropopause.

Curve E concerning the balloon according to the invention deflects at 28-30 km of altitude because of the influence of the thermal trapping hood with respect to the curve F relative to the conventional balloon without the hood. This deflection toward higher temperatures permits it to cross the theoretical stability curve G at a point of stability T corresponding to the stable level of the night. This point T is situated above the tropopause (temperature inversion).

On the contrary, curve F of the conventional balloon has no point of intersection with curve G above the tropopause, such that this balloon enters irreversible descent.

I claim:

1. A process for stabilizing at altitude a stratospheric balloon between upper and lower levels during the course of a plurality of diurnal and nocturnal cycles, comprising:
   providing a stratospheric balloon of an open, variable volume type, having a transparent envelope (1) able to achieve both a full state in which said envelope is entirely inflated and reduced states of inflation in which said envelope has the shape of an upper bulb with a lower train extending therefrom,
   providing on the upper part of the balloon a thermal trapping hood (7) having reflecting properties on the side surface:
   greater than 1% of the total surface area of the balloon in the full state, so as to cover a significant portion of the bulb in a state of reduced inflation and limiting in this state the loss of energy by retransmission to the exterior, and
   less than about 15% of the total surface area of the balloon in the full state in such a manner as to only slightly modify the thermal balance of the balloon in this state, and to leave uncovered the lower part of the bulb in a reduced state of fullness,
   introducing a lighter than air gas into the balloon and launching the balloon by a conventional stratospheric balloon launching process.

2. A process as in claim 1 and including providing the balloon with a thermal trapping hood (7) having thermal insulating properties.

3. A process as in claim 1, comprising providing the balloon with a hood having reflecting properties toward the exterior of the balloon.

4. A process as in claim 1, comprising providing the balloon with a thermal trapping hood (7) having a surface comprising essentially between 2% and 5% of the total surface of the balloon in the full state.

5. A process as in claim 4 for stabilizing the balloon between limits ranging from 15 km (nocturnal cycles) to 45 km (diurnal cycles), comprising:
   providing the stratospheric balloon with an envelope (1) able to occupy when full a volume V comprising between $10^5$ and $2 \times m^3$,
   equipping said balloon with a thermal trapping hood (7) having a surface of about 3% of the balloon surface in the fully inflated state,
   introducing hydrogen or helium into the balloon,
   providing a working load (6) such that the total buoyant mass M satisfies the following relationship:

$$1.9 \times 10^{-3} V \leq M \leq 3.9 \times 10^{-3} V$$

where M is expressed in kg and the volume V in m³.

6. An open, variable volume stratospheric balloon comprising a flexible envelope (1) of a transparent synthetic material having in its lower portion gas evacuation sleeves (2) and means for securing a load (6), a thermal trapping hood (7) secured to the upper portion of said envelope, said hood having reflecting properties toward the interior of the envelope and having a surface area of essentially between 1% and 15% of the total surface of the envelope.

7. A stratospheric balloon as in claim 6, and wherein said thermal trapping hood (7) comprises a thermal insulating composite having at least one reflecting face oriented toward the interior of the envelope.

8. A stratospheric balloon as in claim 7, and wherein said thermal trapping hood (7) is formed of a composite comprising at least one polyester sheet (8, 9, 10) metallized on at least its internal face, and at least one layer of open cell polyester foam (11, 12) perforated by a plurality of openings.

9. A stratospheric balloon as in claim 8, and wherein said composite forming the thermal trapping hood is metallized on its internal face (10a) of the outer sheet (10).

10. A stratospheric balloon as in claim 6, and wherein said envelope comprises an assembly of longitudinal gores (1a), stress take-up strips (3) secured at the edges of said gores and connected at the lower portion to means for attaching a load (6), and a transparent reinforcing dome (5) assembled to the upper portion at the edges of the gores (1a), said thermal trapping hood (7) being secured to said force take-up strips (3).

11. A stratospheric balloon as in claim 10 and wherein said gores (a) of said envelope are secured to the upper pole at a pole piece (4) through a fold forming an external flange (1b), said thermal trapping hood (7) being secured at the upper pole to the gores (1a) and their external flange (1b).

12. A stratospheric balloon as in claim 6 and wherein said envelope (1) has a volume when full of between $10^5$ and $2\times10^6$ m$^3$.

13. A stratospheric balloon as in claim 12, and wherein said thermal trapping hood (7) has the shape of a dome surrounding the upper pole of the balloon and a surface between 2% and 5% of the total surface area of the envelope.

* * * * *